United States Patent [19]

Smith

[11] 4,179,182
[45] Dec. 18, 1979

[54] HOLOGRAPHIC JEWEL

[76] Inventor: Morris R. Smith, 1346 Caminito Septimo, Cardiff, Calif. 92007

[21] Appl. No.: 845,727

[22] Filed: Oct. 28, 1977

[51] Int. Cl.$^2$ .......................... G03H 1/20; G03H 1/24
[52] U.S. Cl. ................... 350/3.69; 350/3.86; 359/3.60
[58] Field of Search ................. 350/3.86, 3.85, 3.69, 350/3.6, 3.61, 3.70, 3.76, 162 R, 175 R, 235–238

[56] References Cited

U.S. PATENT DOCUMENTS

| 3,515,452 | 6/1970 | Pole | 350/3.76 |
|---|---|---|---|
| 3,552,853 | 1/1971 | Sanders et al. | 350/3.61 |
| 3,754,808 | 8/1973 | Clay et al. | 350/3.86 |
| 3,778,361 | 12/1973 | Courtney-Pratt | 350/3.70 |

OTHER PUBLICATIONS

Stroke et al., *Physics Letters*, vol. 20, No. 4, Mar. 1966, pp. 368–370.

Rotz et al., *Applied Physics Letters*, vol. 8, No. 6, Mar. 1966, pp. 146–148.

*Primary Examiner*—Ronald J. Stern
*Attorney, Agent, or Firm*—Knox & Knox

[57] ABSTRACT

A jewel and method of making same, the jewel being a unique hologram and lens combination. A reflection hologram of an object is first made and the psuedoscopic image is then used in recording a second generation hologram which permits reconstruction of the virtual image near or within the lens upon which the second generation hologram is located, usually being adhered thereto, the lens functioning to refract incident white light and enhancing spectral changes and brightness, while virtually eliminating the critical angle effect in the viewing of the jewel, and dramatically increasing the optical leverage or proportional magnification of apparent movement of the image for any given alteration in the incident light or viewing angle relative to the jewel.

13 Claims, 10 Drawing Figures

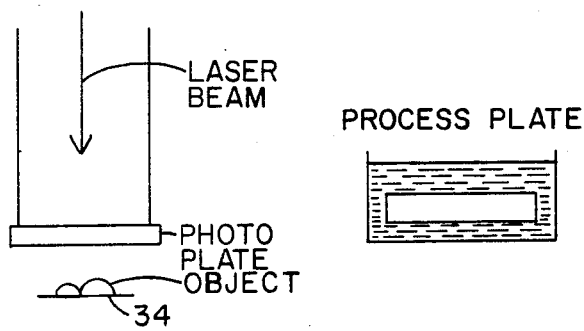
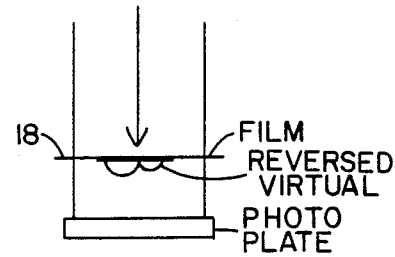
FIG.1    FIG.2    FIG.3
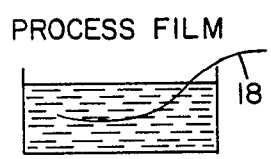
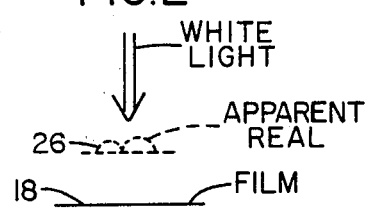
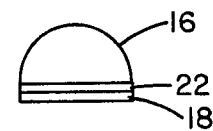
FIG.4    FIG.5    FIG.6
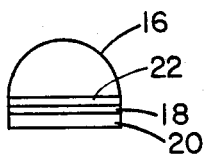
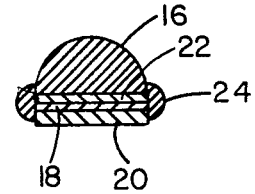
FIG.7    FIG.8
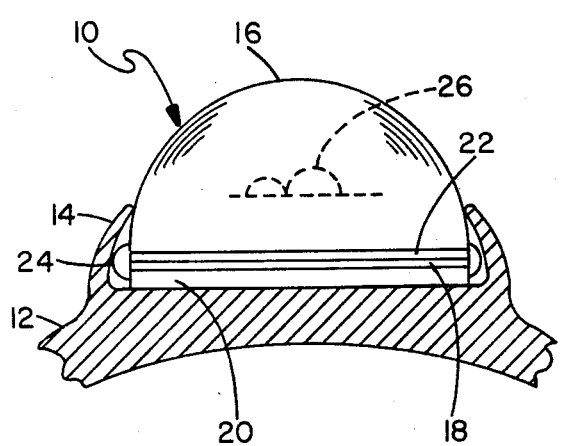
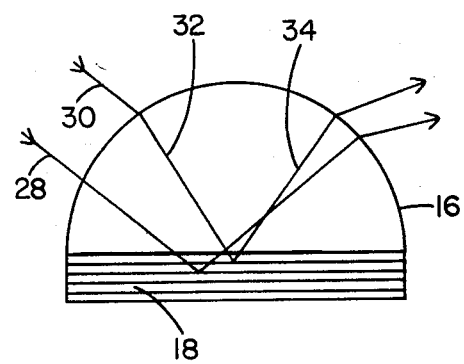
FIG.9    FIG.10

HOLOGRAPHIC JEWEL

BACKGROUND OF THE INVENTION

A hologram has been described as "a negative produced by a high resolution photographic plate, without camera or lens, near a subject illuminated by monochromatic coherent radiation, as from a laser: when placed in a beam of light a true three dimensional image of the object is formed". Ordinarily a positive transparency or the like is made and modern holography is not limited to monochromatic light. The image in a hologram possesses the depth and parallax properties of real objects and when color is added the attractiveness of the image, with the apparent movement thereof when the angle of incident light and/or viewing angle is changed, makes the hologram an ideal point of interest for jewelry such as finger rings and the like. There is a need, however, to enhance spectral or chromatic qualities and to magnify the apparent movement of the image in order to enhance the life-like qualities of the image and to make the hologram economically reproducible and durable.

SUMMARY OF THE INVENTION

The herein claimed invention is a satisfactory response to the immediately beforementioned need and comprises a jewel, and method of making the same, wherein the hologram used is a second generation hologram derived from a psuedoscopic image in an original hologram and recorded ordinarily in the emulsion of a "thick" film, the reconstruction being accomplished by ordinary white light directed onto the hologram by a lens so the reconstructed image appears adjacent to and on the viewer side of the film, the film having a backing which is sealed to the lens, thus protecting the hologram from the effects of moisture. The lens enhances brightness and spectral qualities and gives optical leverage.

BRIEF DESCRIPTION OF THE DRAWING

FIG. 1 is a diagrammatic illustration of the first major step in a method of making a jewel according to this invention, namely, the exposure of a photographic plate near an object, using a collimated light beam;

FIG. 2 represents the next step, the processing of the plate;

FIG. 3 diagrammatically represents the next step or steps of reconstruction of the psuedoscopic image, inverted and on the side of the photographic plate toward the incident light source, and the exposure of a photographic film adjacent to the plane of this image to create what is herein referred to as the second generation hologram;

FIG. 4 represents the processing of the film exposed in FIG. 3;

FIG. 5 is a diagrammatic representation of the reconstruction of the second generation hologram, in use, employing available white light;

FIG. 6 represents the step of adding a lens, and the non-mandatory but preferred step of affixing the processed film to the lens;

FIG. 7 represents a non-mandatory but preferred step of adding a backing of glass or the like to the combined lens and film;

FIG. 8 represents the step of sealing the lens and a backing with the film protected therebetween;

FIG. 9 is a fragmentary cross-sectional view of a finding, a finger ring, with a jewel constructed according to this invention mounted therein, the approximate location of the image being indicated in dash line; and FIG. 10 is a diagrammatic view of the jewel, showing the lens and the film only, the latter being shown stratified to illustrate how rays of light, after first being refracted by the lens, are reflected from different particles at different depths and locations in the film to produce spectral shift, the incident light rays also indicating how the lens virtually eliminates total reflection effects.

DETAILED DESCRIPTION OF A PREFERRED EMBODIMENT

Referring now to the drawing, wherein like numerals refer to identical or similar parts throughout the different views, this invention relates to a jewel, generally indicated by the numeral 10, for a finger ring 12 or a similar finding which will ordinarily have integral bezel means illustrated by the claws 14 to retain the jewel. The jewel 10 comprises essentially a lens 16 and the Lippmann-Bragg hologram herein alternatively is referred to simply as the processed film 18. In the preferred form the jewel will regularly have a backing 20, ordinarily glass although it may be another sturdy material, and the processed film 18 will be affixed to the lens 16 by an adhesive 22 which may be an epoxy resin. Finally, in regard to the principal elements of the jewel 10, a seal 24, shown as a bead peripherally bonding the backing 20 to the adjacent edge of the lens, protects the hologram from the effects of exposure to the air and moisture, since the emulsion thickness is sensitive to ambient humidity.

This last point is important since the hologram image, indicated at 26 is desired to be multi-colored and a thick emulsion, at least several microns, is required as indicated diagrammatically in FIG. 10, so that light rays 28, 30 upon entering the emulsion of film 18 will travel different distances before striking reflective particles, such as silver in ordinary silver halide emulsions or the equivalent in other films if used, so that undue thickness aberration is to be avoided. Triethanolamine may be used to cause a slight swelling of the emulsion corrective of the natural shrinkage but this is acknowledged as prior art and is not claimed as a feature of this invention except possibly in combination with the novel features claimed hereunder. The adhesive 22 may also be colored.

It will be evident that the representative rays 28 and 30, which may be thought of as ordinarily being available white light, the same as indicated in FIG. 5, will usually be refracted as indicated at 32, reflected as at 34 and emerge from the lens 16 with spectral or chromatic variations influenced by the lens, by the thickness of the film 18, the nature of the hologram thereon, as well as by the angle of incidence of the rays. The result is a wide variation in color, enhanced further by the variation in the nature of the incident light source which will vary widely according to the environment of use. It will also be evident that the index of refraction of the film 18 and adhesive 22 should at least roughly match that of the lens. A lens such as the plano-convex lens illustrated will virtually eliminate any critical angle effects as well as increase the field of view. The lens is also instrumental in accentuating optical leverage as explained below in the discussion of the method of making the jewel.

Coming now to the method of making the jewel it may first be noted that the original or first generation hologram is preferably made with a laser beam and the object 36 will usually be a three-dimensional object such as a small figurine. The photographic plate is processed and the next principal step is the making of a second generation hologram wherein the reversed virtual or psuedoscopic image is transferred to film 18 interposed at the image location, all as indicated in FIG. 5. The term "second generation hologram" is employed herein as including the concept of using a regular hologram reversed to place the virtual image on the viewer side of the hologram or the use of a reverse or mold of the object.

This second generation hologram is processed and when reconstructed as indicated in FIG. 5 the apparently real image 26 appears on the viewer side of the hologram which is also the side from which the reconstruction light must come, it being recalled that this is a reflective hologram and that the viewing or reconstruction light source will ordinarily be non-collimated solar or incandescent.

The next step in making the jewel is the addition of a lens 16 which has three functions, namely, increasing the field of view, preventing total reflection of incident light, and providing optical leverage. By the last term, optical leverage, is meant the considerably increased proportional apparent movement of the image 26 for any movement of jewel relative to the incident light, that is, any change of the relative positions of the jewel and light source as when the wearer of a ring 12 moves his hand relative to the incident light source. This last mentioned feature is quite important since a great deal of the appeal of the item derives from the fact that the image, being holographic, appears to twist and turn in a very life-like manner when the jewel is moved. Although the lens is shown as plano-convex other shapes can obviously be substituted.

The film 18 may be secured to the lens by an adhesive 22 such as on epoxy resin or the film can be clamped between the lens and a backing 20. In either case a backing of suitable size to conform with the lens should be sealed in place on the lens with the film therebetween for reasons explained supra. Such a seal is indicated at 24.

The foregoing steps complete the method of making the jewel and the jewel may then be fastened in place in a finding such as a finger ring or the like as indicated in FIG. 9.

Variations will occur to those skilled in the art, all within the concept, purview and bounds set out in the appended claims, as for example, substitutes may be proposed for the above mentioned laser, dichromatic gel or other film may be used in lieu of silver halide emulsion, the second generation hologram may be achieved in a manner varying from those mentioned above and of course the manner of mounting the jewel may be altered at will.

Variant but essentially equivalent optical techniques can be used to obtain a hologram with a projected real image, a hologram with the image on the viewer's side, and then positioning this hologram on a viewing lens. As stated above the adhesive 22 may be colored or it may contain pearlescent or phosphorescent material to achieve intriguing color effects.

Having described my invention, what I claim as new is:

1. A white light hologram jewel for jewelry, comprising:
   (a) a second generation Lippmann-Bragg hologram having an orthoscopic image of an object recorded therein, said image appearing on the viewer side of the hologram, said second generation hologram being made by using a psuedoscopic image reconstructed from a first hologram as the object for making said second generation hologram;
   (b) a thick lens discrete from said hologram, bonded to and covering the viewer side of said hologram;
   (c) said lens providing optical leverage in that a small tilt of the jewel relative to a read-out incident light beam causes a large spectral shift enhancing color change and amplifying the optical illusion of the object turning about a point in the jewel.

2. A jewel according to claim 1 and mounted in a finding with the lens disposed outwardly of the finding.

3. A jewel according to claim 2 and including an adhesive securing said hologram on said lens.

4. A jewel according to claim 3 and including a protective backing for said hologram.

5. A jewel according to claim 4 wherein said backing is glass.

6. A jewel according to claim 4 and wherein said first lens is peripherally sealed to said backing so as to prevent moisture from reaching the hologram.

7. A jewel according to claim 1 wherein said first hologram comprises a thick emulsion.

8. A jewel according to claim 7 wherein the index of refraction of said lens matches that of the emulsion to lessen distortion of the image.

9. A jewel according to claim 2 wherein said lens is plano-convex and said hologram is affixed to the plane surface of said lens, so that the convexity of the lens increases the field of view.

10. A method of making a white light hologram jewel, comprising the following steps:
    (a) making a Lippmann-Bragg hologram having a psuedoscopic image;
    (b) using said psuedoscopic image of the original hologram as an object for a second generation, Lippmann-Bragg hologram;
    (c) recording the image on a photosensitive medium as a second generation Lippmann-Bragg hologram; and
    (d) fastening the photosensitive medium on a thick viewing lens, whereby the secomd generation image exhibits apparent animation, under white light, upon relative movement of said lens and the incident angle of said white light and/or a viewer's eye.

11. A method according to claim 10 wherein said fastening in Step (d) is accomplished by using a transparent bonding agent.

12. A method according to claim 10 and including the step of adding a backing on the side of the film remote from the lens.

13. A method according to claim 12 and including the step of peripherally sealing the lens to the backing with the film therebetween to prevent moisture from reaching the film and damaging the hologram.

* * * * *